(12) United States Patent
Oda et al.

(10) Patent No.: US 12,313,489 B2
(45) Date of Patent: May 27, 2025

(54) OPTICAL FIBER MEASUREMENT SYSTEM, OPTICAL FIBER MEASUREMENT METHOD, CONTROL ARITHMETIC DEVICE, AND PROGRAM

(71) Applicant: NIPPON TELEGRAPH AND TELEPHONE CORPORATION, Tokyo (JP)

(72) Inventors: Tomokazu Oda, Musashino (JP); Atsushi Nakamura, Musashino (JP); Daisuke Iida, Musashino (JP); Yusuke Koshikiya, Musashino (JP); Nazuki Honda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 180 days.

(21) Appl. No.: 18/026,856

(22) PCT Filed: Oct. 7, 2020

(86) PCT No.: PCT/JP2020/038026
§ 371 (c)(1),
(2) Date: Mar. 17, 2023

(87) PCT Pub. No.: WO2022/074767
PCT Pub. Date: Apr. 14, 2022

(65) Prior Publication Data
US 2023/0332980 A1    Oct. 19, 2023

(51) Int. Cl.
*G01M 11/02*    (2006.01)
(52) U.S. Cl.
CPC .................................. *G01M 11/02* (2013.01)
(58) Field of Classification Search
CPC ............ G01M 11/338; G01M 11/337; G01M 11/336; G01M 11/335; G01M 11/333;
(Continued)

(56) References Cited

U.S. PATENT DOCUMENTS 5,909,450 A * 6/1999 Wright ............. G01R 31/31926
714/724
7,565,084 B1 * 7/2009 Wach ..................... H04J 14/04
398/201
(Continued)

FOREIGN PATENT DOCUMENTS

JP    2019-152457 A    9/2019
JP    2020026976 A    2/2020

OTHER PUBLICATIONS

T. Oda et al., "Measurement of Modal Attenuation and Crosstalk in Spliced Few-Mode Fibres Based on Mode-Resolved BOTDA", Proc. ECOC2019, P36 (2019).
(Continued)

*Primary Examiner* — John R Lee
(74) *Attorney, Agent, or Firm* — Harness, Dickey & Pierce, P.L.C.

(57) ABSTRACT

An optical fiber measurement system is presented. The optical fiber measurement system includes a light incident circuit which makes a probe light incident on one end of an optical fiber and makes a secondary probe light and a pump light as an optical pulse incident on the other end of the optical fiber; a light receiver which measures a light intensity of arbitrary one propagation mode in the probe light propagating through the optical fiber; and a control calculation device which sets a propagation mode of the probe light, the secondary probe light, and the pump light, an optical frequency difference of the secondary probe light, and an optical frequency difference of the pump light with respect to the light incident circuit, and calculates loss and crosstalk at each point in a longitudinal direction of the optical fiber from the light intensity measured by the light receiver.

7 Claims, 7 Drawing Sheets

(58) Field of Classification Search
CPC .. G01M 11/332; G01M 11/331; G01M 11/33; G01M 11/30; G01M 11/088; G01M 11/08; G01M 11/0271; G01M 11/0214; G01M 11/0207; G01M 11/02
See application file for complete search history.

(56) References Cited

U.S. PATENT DOCUMENTS

| | | | |
|---|---|---|---|
| 7,679,732 B2* | 3/2010 | Hotate | G01M 11/333 356/73.1 |
| 8,493,556 B2* | 7/2013 | Li | G01K 11/32 356/73.1 |
| 9,131,915 B2* | 9/2015 | Amiri Farahani | A61B 6/5258 |
| 9,476,699 B2* | 10/2016 | Yao | G01L 1/243 |
| 9,784,643 B2* | 10/2017 | Hotate | G01M 11/3181 |
| 11,221,274 B1* | 1/2022 | He | G01H 9/004 |
| 11,378,489 B2* | 7/2022 | Takahashi | H04B 10/2581 |
| 11,402,295 B2* | 8/2022 | Oda | G01M 11/39 |
| 11,473,983 B2* | 10/2022 | Murray | G01K 3/00 |
| 11,719,599 B2* | 8/2023 | Nakamura | G01M 11/39 356/73.1 |
| 11,788,928 B2* | 10/2023 | Oda | G01M 11/319 356/73.1 |
| 11,796,419 B2* | 10/2023 | Redding | H01S 3/08036 |
| 11,879,803 B2* | 1/2024 | Oda | G01M 11/338 |
| 2004/0001194 A1* | 1/2004 | Wilstrup | G01M 11/338 356/73.1 |
| 2010/0165328 A1* | 7/2010 | Hirano | G01M 11/338 356/73.1 |
| 2013/0216176 A1* | 8/2013 | Li | G01L 1/246 385/12 |
| 2014/0218717 A1* | 8/2014 | Zhang | G01M 11/39 356/32 |
| 2014/0306101 A1* | 10/2014 | Zornoza Indart | G01D 5/35364 250/227.14 |
| 2015/0377656 A1* | 12/2015 | Bastianini | G01D 5/35364 356/300 |
| 2016/0258743 A1* | 9/2016 | Yao | G01L 1/242 |
| 2017/0205253 A1* | 7/2017 | Handerek | G01D 5/3539 |
| 2017/0254708 A1* | 9/2017 | Koizumi | G01D 5/28 |
| 2018/0023948 A1* | 1/2018 | Bennett | G01K 11/32 356/601 |
| 2018/0094987 A1* | 4/2018 | Iwamura | G01K 11/32 |
| 2020/0408636 A1* | 12/2020 | Takahashi | G01M 11/319 |
| 2021/0310897 A1* | 10/2021 | Oda | G01M 11/39 |
| 2021/0381925 A1* | 12/2021 | Takahashi | G01M 11/3145 |
| 2021/0396626 A1* | 12/2021 | Okamoto | G01D 5/35361 |
| 2022/0260454 A1* | 8/2022 | Oda | G01M 11/39 |
| 2022/0381645 A1* | 12/2022 | Nakamura | G01M 11/39 |
| 2023/0288289 A1* | 9/2023 | Nakamura | G01M 11/0207 |
| 2023/0332980 A1* | 10/2023 | Oda | G01M 11/02 |
| 2024/0264034 A1* | 8/2024 | Oda | G01M 11/02 |
| 2024/0377282 A1* | 11/2024 | Oda | G01M 11/331 |

OTHER PUBLICATIONS

Tomokazu Oda et al., "Investigation on measurement of loss and crosstalk at splice point in two-mode fiber based on Brillouin optical time domain analysis", IEICE Technical Report, Aug. 22, 2019, vol. No. 187, 29-32 with a machine generated English translation thereof.

* cited by examiner

OPTICAL FIBER MEASUREMENT SYSTEM, OPTICAL FIBER MEASUREMENT METHOD, CONTROL ARITHMETIC DEVICE, AND PROGRAM

CROSS-REFERENCE TO RELATED APPLICATIONS

This application is a 371 U.S. National Phase of International Application No. PCT/JP2020/038026, filed on Oct. 7, 2020. The entire disclosure of the above application is incorporated herein by reference.

TECHNICAL FIELD

The present disclosure relates to a measurement system, a measurement method thereof, a control calculation device thereof, and a program for measuring loss and crosstalk (XT) generated at each point in an optical fiber transmission line independently.

BACKGROUND ART

In recent years, with rapid increase in transmission traffic, a few-mode fiber (FMF) and a multi-mode fiber (MMF), with which a plurality of propagation modes can be used, have been attracting a lot of attention as fibers that can realize a further increase in capacity, instead of single-mode fiber (SMF) used in current transmission lines. In these fibers, a loss difference between modes (DMA) caused by a difference in loss received for each mode when passing through a connection point or a device such as a mode duplexer, or a crosstalk (XT) in which a part of the mode at the time of incident binds to a different mode occurs. Since DMA and XT are important parameters for signal processing on a receiving side, it is desirable to be able to measure the loss and XT of each mode in the transmission line for each section in order to evaluate the quality of the transmission line.

So far, a method for acquiring propagation characteristics for each mode that uses a Brillouin gain analysis method has been disclosed (see, for example, NPL 1). In this measurement method, the loss and XT received by a pump light can be acquired from the generated gain amount, by controlling a frequency difference between the pump light and a probe light incident on the fiber.

CITATION LIST

Non Patent Literature

[NPL 1]
T. Oda et al., Proc. ECOC2019, P36 (2019).

SUMMARY OF INVENTION

Technical Problem

When there are a plurality of loss and XT generation points, an XT component of the probe light is generated in the fiber, and a gain by the XT component becomes an error factor. Therefore, the method of the non-patent literature has a problem that it is difficult to measure losses and XT generated at a plurality of points for each point.

In order to solve the above problem, an object of the present invention is to provide an optical fiber measurement system, an optical fiber measurement method, a control calculation device, and a program that are capable of measuring a loss and XT generated at a plurality of points in an optical fiber in which a plurality of modes propagate for each point.

Solution to Problem

In order to achieve the above object, the optical fiber measurement system according to the present invention utilizes two probe light beams and Brillouin gain coefficients between respective modes to decompose gain components into loss and XT components.

Specifically, the optical fiber measurement system according to the present invention includes
  a light incident circuit which makes probe light be incident on one end of an optical fiber and makes a secondary probe light and a pump light as an optical pulse incident on the other end of the optical fiber;
  a light receiver which measures a light intensity of arbitrary one propagation mode in the probe light propagating through the optical fiber; and
  a control calculation device which sets a propagation mode of the probe light, the secondary probe light, and the pump light, and an optical frequency difference of the secondary probe light, and an optical frequency difference of the pump light with respect to the light incident circuit, and calculates a loss and crosstalk at each point in a longitudinal direction of the optical fiber to be measured connected as the optical fiber, from the light intensity measured by the light receiver,
wherein the control calculation device:
when an optical fiber to be measured is connected as the optical fiber, with respect to the light incident circuit,
  makes the probe light incident on one end of the optical fiber in an arbitrary propagation mode,
  makes the secondary probe light, which has an optical frequency difference from the probe light on a low frequency side, incident on the other end of the optical fiber in a propagation mode which becomes a crosstalk component of the probe light,
  makes the pump light, which has an optical frequency difference from the probe light on a high frequency side, incident in an arbitrary propagation mode,
  acquires a distribution of a Brillouin amplification amount of the probe light in the longitudinal direction of the optical fiber to be measured from the light intensity, and
  calculates the loss and crosstalk, using a level difference of the Brillouin amplification amount appearing in the distribution and a Brillouin gain coefficient determined by an optical frequency difference between the pump light and the probe light and a propagation mode.

In addition, an optical fiber measurement method according to the present invention,
using an optical fiber measurement system which includes
  a light incident circuit which makes a probe light incident on one end of an optical fiber and makes a secondary probe light and a pump light as an optical pulse incident on the other end of the optical fiber,
  a light receiver which measures a light intensity of an arbitrary one propagation mode in the probe light propagating through the optical fiber, and
  a control calculation device which sets a propagation mode of the probe light, the secondary probe light, and the pump light, an optical frequency difference of the secondary probe light, and an optical frequency difference of the pump light with respect to the light incident circuit, and calculates loss and crosstalk at each point in a longitudinal direction of the optical fiber to be measured connected as the optical fiber, from the light intensity measured by the light receiver, wherein when an optical fiber to be measured is connected as the optical fiber, making the probe light be incident on one end of the optical fiber in an arbitrary propagation mode;

making the secondary probe light, which has an optical frequency difference from the probe light on a low frequency side, incident on the other end of the optical fiber in a propagation mode which becomes a crosstalk component of the probe light;

making the pump light, which has an optical frequency difference from the probe light on a high frequency side, incident in an arbitrary propagation mode;

acquiring a distribution of a Brillouin amplification amount of the probe light in the longitudinal direction of the optical fiber to be measured from the light intensity; and calculating the loss and crosstalk, using a level difference of the Brillouin amplification amount appearing in the distribution and a Brillouin gain coefficient determined by an optical frequency difference between the pump light and the probe light and a propagation mode.

Further, according to the present invention, there is provided a control calculation device of an optical fiber measurement system including:

a light incident circuit which makes a probe light incident on one end of an optical fiber and makes a secondary probe light and a pump light as an optical pulse incident on the other end of the optical fiber; and a light receiver which measures a light intensity of arbitrary one propagation mode in the probe light propagating through the optical fiber, wherein the control calculation device includes a control unit which sets a propagation mode of the probe light, the secondary probe light, and the pump light, an optical frequency difference of the secondary probe light, and an optical frequency difference of the pump light with respect to the light incident circuit, and a calculation unit which calculates loss and crosstalk at each point in a longitudinal direction of the optical fiber to be measured connected as the optical fiber, from the light intensity measured by the light receiver, wherein when an optical fiber to be measured as the optical fiber is connected to the optical fiber measurement system, with respect to the light incident circuit, the control unit makes the probe light incident on one end of the optical fiber in an arbitrary propagation mode, makes the secondary probe light, which has an optical frequency difference from the probe light on a low frequency side, incident on the other end of the optical fiber in a propagation mode which becomes a crosstalk component of the probe light, and makes the pump light having an optical frequency difference on a high frequency side from the probe light incident in an arbitrary propagation mode, wherein the calculation unit acquires a distribution of a Brillouin amplification amount of the probe light in the longitudinal direction of the optical fiber to be measured from the light intensity, and calculates the loss and crosstalk, using a level difference of the Brillouin amplification amount appearing in the distribution, an optical frequency difference between the pump light and the probe light, and a Brillouin gain coefficient determined by a propagation mode.

The optical fiber measurement system acquires the distribution of the Brillouin amplification amount of the probe light in the longitudinal direction of the optical fiber, while suppressing the XT component of the probe light, using the secondary probe light. The loss and XT can be calculated for each point, using the level difference of multiple Brillouin amplifications appearing in the distribution and the Brillouin gain coefficient acquired separately. Therefore, the present invention can provide an optical fiber measurement system, an optical fiber measurement method, and a control calculation unit that are capable of measuring the loss and XT generated at a plurality of points of an optical fiber propagating in a plurality of modes for each point.

The Brillouin gain coefficient can be acquired as follows. When a reference optical fiber having the same characteristics as the optical fiber to be measured and having no mode coupling is connected as the optical fiber, with respect to the light incident circuit, the control calculation device makes the probe light incident on one end of the optical fiber and the pump light incident on the other end of the optical fiber, while changing an optical frequency difference between the probe light and the pump light in a combination of all propagation modes propagating through the optical fiber to be measured, and acquires the Brillouin gain coefficient in a combination of each optical frequency difference and each propagation mode from the light intensity.

The control calculation device sets an optical frequency difference between the secondary probe light and the probe light as an optical frequency difference that gives a Brillouin loss only to a crosstalk component of the probe light. The loss and XT can thus be measured accurately.

Further, the present invention is a program that causes a computer to function as the control calculation device. The control calculation device can be realized by a computer and a program, and the program can also be recorded on a recording medium or can also be provided via a network.

Advantageous Effects of Invention

The present invention can provide an optical fiber measurement system, an optical fiber measurement method, a control calculation device, and a program that are capable of measuring loss and XT generated at a plurality of points of an optical fiber, in which a plurality of modes propagate, for each point.

DESCRIPTION OF EMBODIMENTS

Embodiments of the present invention will be described with reference to the accompanying drawings. The embodiments described below are examples of the present invention and the present invention is not limited to the following embodiments. Note that constituent elements with the same reference signs in the present description and the drawings are identical to each other.

Embodiment 1

[Device Configuration]

Figure 1:
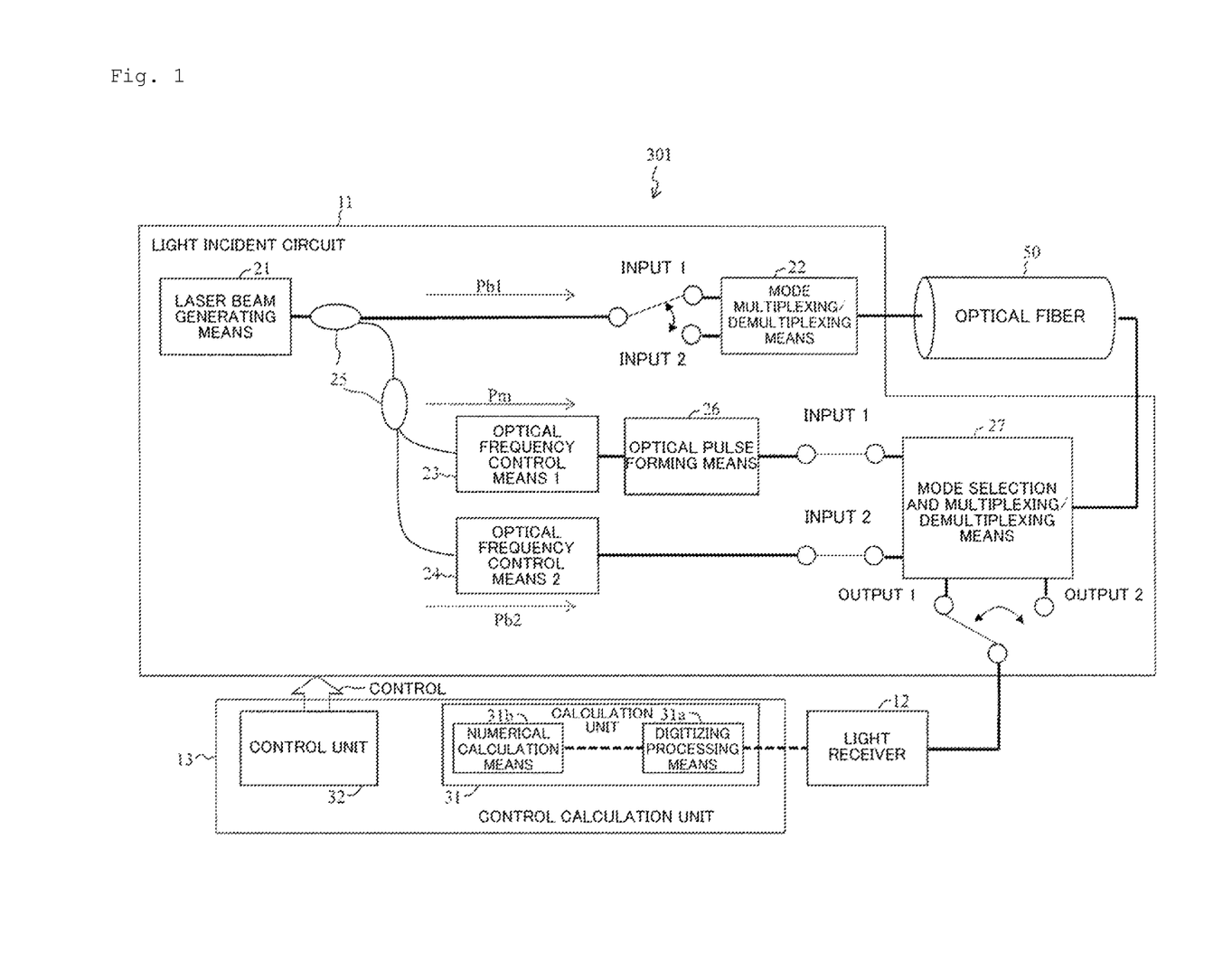
FIG. 1 is a diagram illustrating an optical fiber measurement system according to the present invention.

FIG. 1 is a diagram illustrating an optical fiber measurement system 301 of the present embodiment. The optical fiber measurement system 301 is an example of the configuration for realizing the present invention. The optical fiber measurement system 301 includes a light incident circuit 11 which makes probe light Pb1 incident on one end of an optical fiber 50 and makes secondary probe light Pb2 and pump light Pm as an optical pulse incident on the other end of the optical fiber 50,
- a light receiver 12 which measures a light intensity of an arbitrary one propagation mode in the probe light Pb1 propagated through the optical fiber 50, and
- a control calculation device 13 which sets a propagation mode of the probe light Pb1, the secondary probe light Pb2, and the pump light Pm, an optical frequency difference of the secondary probe light Pb2 and an optical frequency difference of the pump light Pm with respect to the light incident circuit 11, and calculates loss and crosstalk at each point in a longitudinal direction of the optical fiber to be measured connected as the optical fiber 50, from the light intensity measured by the light receiver 12, in which the control calculation device 13
- when the optical fiber to be measured is connected as the optical fiber 50, with respect to the light incident circuit 11, makes the probe light Pb1 incident on one end of the optical fiber 50 in an arbitrary propagation mode,
- makes the secondary probe light Pb2 having an optical frequency difference from the probe light Pb1 on a low frequency side incident on the other end of the optical fiber 50 in a propagation mode which becomes a crosstalk component of the probe light Pb1,
- makes the pump light Pm having an optical frequency difference on a high frequency side from the probe light Pb1 incident in an arbitrary propagation mode,
- acquires a distribution of a Brillouin amplification amount of the probe light Pb1 in a longitudinal direction of the optical fiber to be measured from the light intensity, and
- calculates the loss and crosstalk, using a level difference of the Brillouin amplification amount appearing in the distribution, an optical frequency difference between the pump light Pm and the probe light Pb1, and a Brillouin gain coefficient determined by a propagation mode.

The light incident circuit 11 includes a laser beam generating means 21, a mode multiplexing/demultiplexing means 22, optical frequency control means 23 and 24, a branching element 25, an optical pulse forming means 26, and a mode selection multiplexing/demultiplexing means 27.

Light output from the laser beam generating means 21 for generating coherent light is branched into three by the branching element 25, and becomes the probe light Pb1, the pump light Pm, and the secondary probe light Pb2, respectively. The pump light Pm is pulsed by the optical pulse forming means 26 after a frequency difference corresponding to the Brillouin frequency shift of the optical fiber to be measured is given to the higher frequency side by the optical frequency control means 23. On the other hand, a frequency difference of having a lower frequency corresponding to the Brillouin frequency shift of the optical fiber on which measurement is to be performed is applied to the secondary probe light Pb2 by the optical frequency control means 24. Since the pump light Pm and the secondary probe light Pb2 have only to give a frequency difference corresponding to the Brillouin frequency shift to the probe light Pb1, three laser light generating means 21 having different optical frequencies are provided without using optical frequency control means 23 and 24, and the optical frequency difference between the three lasers may be controlled by separately using the light sources of the pump light Pm, the probe light Pb1, and the secondary probe light Pb2.

The probe light Pb1 is converted into an arbitrary mode by the mode multiplexing/demultiplexing means 22 and then made incident on one end of the optical fiber to be measured (the optical fiber 50). The mode multiplexing/demultiplexing means 22 shown in FIG. 1 has a structure that has inputs 1 and 2, and is switched by a switch. When light is made incident on the input 1 of the mode multiplexing/demultiplexing means 22, the light is output as a first propagation mode, and when light is made incident on the input 2, the light is output as a second propagation mode. That is, the mode multiplexing/demultiplexing means 22 can arbitrarily select the propagation mode of the probe light emitted by the switch. The pump light Pm and the secondary probe light Pb2 are converted into an arbitrary mode by the mode selection multiplexing/demultiplexing means 27 and then made incident on the other end of the optical fiber to be measured.

The probe light Pb1 and the secondary probe light Pb2 made incident on the optical fiber to be measured generate a Brillouin interaction in the whole sections of the optical fiber to be measured, and thus, the probe light Pb1 receives Brillouin loss. Here, a loss is given to an arbitrary mode of the probe light Pb1, by controlling a frequency difference between the probe light Pb1 and the secondary probe light Pb2 by the optical frequency control means 24. Thus, the probe light Pb1 of only a specific mode is made to exist in the optical fiber to be measured.

Also, the Brillouin interaction is generated in the whole sections of the optical fiber to be measured for the pulsed pump light Pm and the probe light Pb1 made incident on the optical fiber to be measured, and thus, the probe light Pb1 is Brillouin-amplified. Here, since the pump light Pm is a pulse, an amplification amount of the probe light Pb1 at each time based on the incident time of the pump light Pm corresponds to the light intensity of the pump light Pm at each point of the optical fiber to be measured. The amplified probe light Pb1 is converted into an electric signal by the light receiver 12 after a mode is selected by the mode selection multiplexing/demultiplexing means 27. The mode selection multiplexing/demultiplexing means 27 shown in FIG. 1 has a structure which has outputs 1 and 2, and is switched by a switch. The mode selection multiplexing/demultiplexing means 27 can selectively extract a mode component of the probe light Pb1 emitted from the mode multiplexing/demultiplexing means 22 by the switch. That is, the mode selection multiplexing/demultiplexing means 27 can output a component of a first propagation mode of the probe light Pb1 from the output 1 and a second propagation mode component of the probe light Pb1 from the output 2 by switching the switch.

The control calculation device 13 includes a control unit 32 which sets propagation modes of the probe light Pb1, the secondary probe light Pb2 and the pump light Pm and an optical frequency difference of the secondary probe light Pb2 and an optical frequency difference of the pump light Pm with respect to the light incident circuit 11, and a calculation unit 31 which calculates loss and crosstalk at each point in the longitudinal direction of the optical fiber to be measured connected as the optical fiber 50 from the light intensity measured by the light receiver 12. The calculation unit 31 has a digitizing processing means 31a and a numerical calculation means 31b. A reception signal from the light receiver 12 is digitized by the digitizing processing means 31a, and a Brillouin gain is acquired by the numerical calculation means 31b. A specific method of analyzing the Brillouin gain is as follows. First, a reference intensity of the probe light Pb1 when the pump light Pm is not incident is acquired. Thereafter, the signal intensity in the case where the pump light and the probe light pb1 are incident is acquired. The Brillouin gain can be acquired by calculating the amount of increase in the reference intensity from the signal intensity.

The control unit 32 controls the operation of the light incident circuit 13. Specifically, the control unit 32 sets an optical frequency difference between the probe light Pb1 and the pump light Pm and an optical frequency difference between the probe light Pb1 and the secondary probe light Pb2 with respect to the optical frequency control means 23 and 24. The control unit 32 sets a time for making the pump light Pm as the pulse light incident on the optical fiber 50 (sets a position in the optical fiber 50 to be measured), with respect to the optical pulse forming means 26. Further, the control unit 32 sets the propagation mode of the probe light Pb1, the pump light Pm, and the secondary probe light Pb2 incident on the optical fiber 50, with respect to the mode multiplexing/demultiplexing means 22 and the mode selection multiplexing/demultiplexing means 27. That is, the control unit 32, with respect to the light incident circuit 11, makes the probe light Pb1 incident on one end of the optical fiber 50 in an arbitrary propagation mode, makes the secondary probe light Pb2 having an optical frequency difference from the probe light Pb1 on the low frequency side incident on the other end of the optical fiber 50 in a propagation mode which becomes a crosstalk component of the probe light Pb1, and makes the pump light Pm having an optical frequency difference on a high frequency side from the probe light Pb1 incident in an arbitrary propagation mode.

The configurations are examples. As long as a device configuration is adopted in which an optical frequency difference and an incident time difference corresponding to a frequency (wavelength) shift are given between the pump light Pm, the probe light Pb1, and the secondary probe light Pb2, and the probe light Pb1 amplified by exciting an arbitrary propagation mode can be extracted in a time domain, any means may be adopted. Further, even in a general single-mode optical fiber (SMF), the optical fiber measurement system 301 can measure SMF by making the incident wavelength shorter than a cutoff wavelength. For this reason, the fiber to be measured may be any fiber having a condition in which a plurality of modes propagate.

[Brillouin Gain and Brillouin Loss Generated Between Plurality of Modes]

In the optical fiber 50, a Brillouin frequency shift $v_b$ at which Brillouin amplification and loss are maximum is given as follows:

[Math. 1]

$$v_b = \frac{2n_i V_a}{\lambda}, \quad (1)$$

where $n_i$ denotes an effective refractive index of the mode, $V_a$ denotes an effective velocity of an acoustic wave, and $\lambda$ denotes a wavelength in vacuum.

That is to say, in an optical fiber through which light in a plurality of modes propagates, it means that the Brillouin frequency shift differs depending on the propagation mode, and the Brillouin gain spectrum in each mode is different for each propagation mode. The present invention utilizes this feature.

For the sake of simplicity, description with a number mode optical fiber (FMF) in which only two modes propagate will be provided. When each of the pump light Pm and the probe light (or the probe light Pb1 and the secondary probe light Pb2) have an amplitude in both the $LP_{01}$ and $LP_{11}$ modes, there are three different Brillouin gain spectra of (i) v01-01 (interaction between pump and probe components of $LP_{01}$), (ii)) v01-11 (interaction between the pump component of $LP_{01}$ and the probe component of $LP_{11}$, or interaction between the pump component of $LP_{11}$ and the probe component of $LP_{01}$), and (iii) v11-11 (interaction between pump and probe components of $LP_{11}$).

By adjusting the optical frequency difference between the pump light Pm, the probe light Pb1 and the secondary probe light Pb2 incident on the optical fiber by the use of such properties, amplification and suppression of any mode in the optical fiber can be controlled.

[Acquisition of Brillouin Gain Coefficient]

In the present invention, a Brillouin gain coefficient is used for measurement. Therefore, it is necessary to obtain the Brillouin gain coefficient by some method. In this embodiment, the Brillouin gain coefficient is acquired by a reference optical fiber having the same characteristics as that of the optical fiber to be measured without mode coupling.

The control calculation device 13, when a reference optical fiber having the same characteristics as the optical fiber to be measured and having no mode coupling is connected as the optical fiber 50, with respect to the light incident circuit 11, makes the probe light Pb1 incident on one end of the optical fiber 50 and the pump light Pm incident on the other end of the optical fiber 50, while changing an optical frequency difference between the probe light Pb1 and the pump light Pm in a combination of all propagation modes propagating through the optical fiber to be measured, and acquires the Brillouin gain coefficient in a combination of each optical frequency difference and each propagation mode from the light intensity.

Since the Brillouin gain spectrum generally has a full width at half maximum (FWHM) of about 30 MHz, when the Brillouin frequency shift $v_b$ for each mode is not sufficiently separated, a Brillouin action occurs at the same time for other mode components. That is, since a gain is generated by a mode other than a desired propagation mode when observing the gain, a gain in which a loss component and an XT component are mixed is generated. A Brillouin gain coefficient between each mode is utilized to decompose the gain component into loss and XT components. The decomposition into the XT component and the loss using the gain coefficient will be described below with reference to a plurality of connection point models. The procedure for acquiring the gain coefficient between the respective modes will be described below.

In the optical fiber in which a plurality of modes propagate, the Brillouin frequency shift and the amount of gain differ depending on the combination of modes to be used. The gain coefficient of each mode is acquired by utilizing the difference. First, a reference optical fiber which exhibits the same characteristics as those of the fiber to be measured and in which no mode coupling occurs in the optical fiber is prepared. Then, gain coefficients of respective modes corresponding to a frequency difference between the pump light Pm and the probe light Pb1 are acquired by the optical fiber. Here, the reference optical fiber is a fiber having the same number of propagation modes as that of the optical fiber to be measured, and is an optical fiber in which Brillouin spectrum gain generated between the respective modes (the frequency difference of pump-probe light Pb1 in which a gain is generated and the gain coefficient in the frequency difference thereof) are the same, but there is no mode coupling. That is, the reference optical fiber is used to acquire the Brillouin gain coefficients in advance in a state in which mode coupling has not been occurred.

The gain coefficient is acquired by a combination of the pump light Pm of all propagation modes propagating through the optical fiber to be measured and the probe light Pb1 of any one propagation mode. That is, in a fiber in which only two modes propagate, when the $LP_{01}$ mode is used for the mode of the probe light Pb1, as a combination for acquiring a gain coefficient, (i) v01-01 (interaction between pump and probe components of $LP_{01}$), and (ii) v01-11 (interaction between pump component of $LP_{11}$ and probe component of $LP_{01}$) are acquired.

Figure 2:
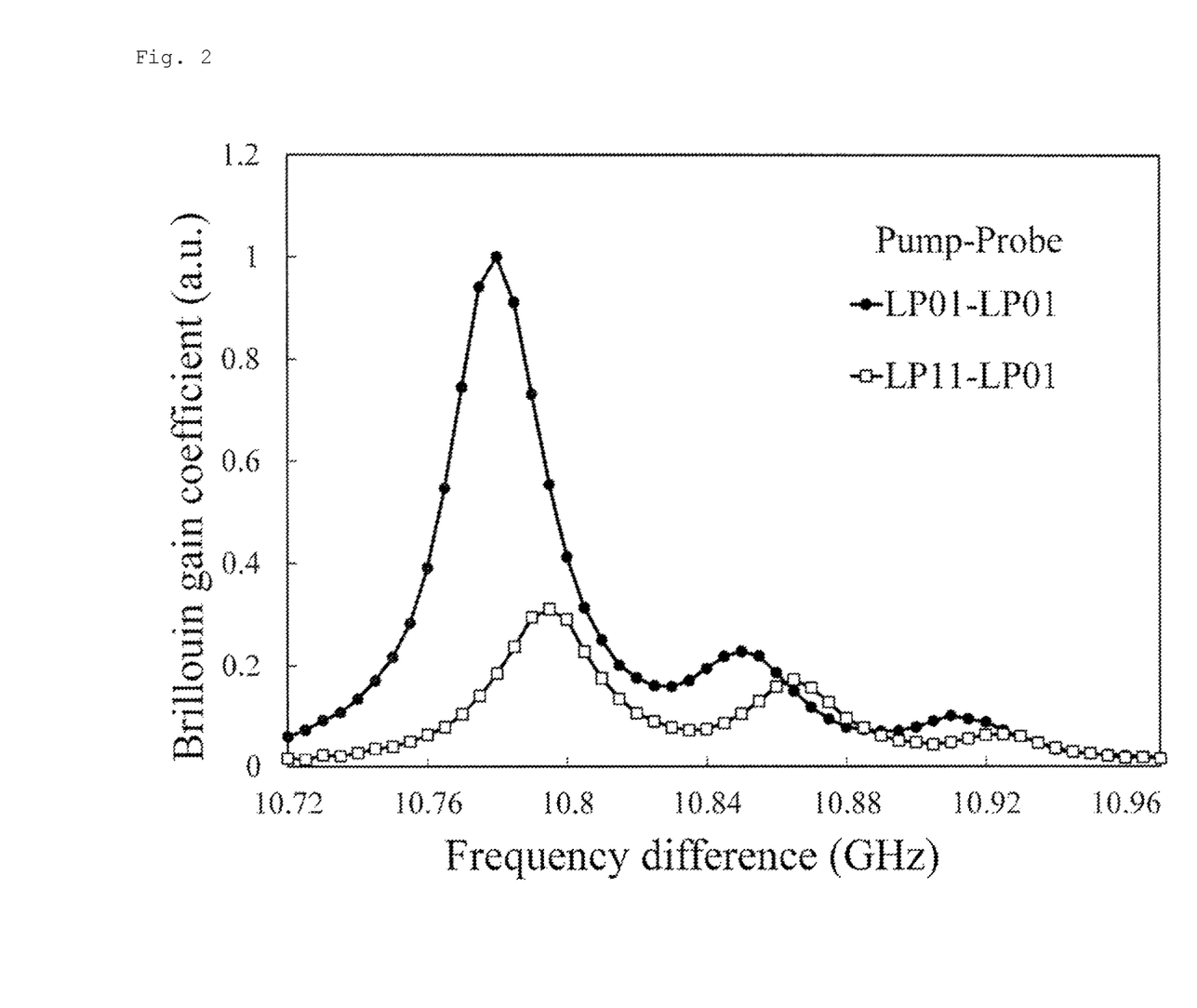
FIG. 2 is a diagram illustrating examples of Brillouin gain spectra in a two-mode fiber.

FIG. 2 is a diagram illustrating an example of Brillouin gain spectral in the case of a two-mode optical fiber. It can be confirmed from FIG. 2 that the gain coefficient of the mode generated by the frequency difference between the pump light and the probe light differs.

The gain coefficient can be acquired, by fixing the power of the propagation mode of the pump light and the probe light, changing the propagation mode of the incident pump light Pm with the propagation mode of the incident probe light Pb1 fixed, and measuring the gain amount at that time.

[Probe Light XT Component Suppression Due to Brillouin Loss]

When there are a plurality of losses and XT generation points in the optical fiber to be measured, a gain is generated by a component (XT of probe light Pb1) other than the mode of the probe light Pb1 used when acquiring the gain coefficient, and it becomes difficult to accurately measure the loss and XT accordingly. Therefore, since a loss is given only to the XT component of the probe light Pb1, the Brillouin action of the probe light Pb1 and the secondary probe light Pb2 is utilized. That is, the control calculation device 13 sets an optical frequency difference between the secondary probe light Pb2 and the probe light Pb1, as an optical frequency difference which gives Brillouin loss only to a crosstalk component of the probe light Pb1.

Specifically, in an optical fiber in which only two modes propagate, when a mode of probe light Pb1 for measuring loss and XT is $LP_{01}$, an $LP_{11}$ mode which becomes an XT component of the probe light Pb1 in the secondary probe light Pb2 is utilized, and (iii) the action of v11-11 (probe between $LP_{11}$, and interaction between secondary probe components) is utilized.

By generating this action in the whole section of the optical fiber to be measured, the XT component of the probe light Pb1 can be suppressed.

[Loss And XT Measurement Using Brillouin Gain and Brillouin Loss]

Figure 3:
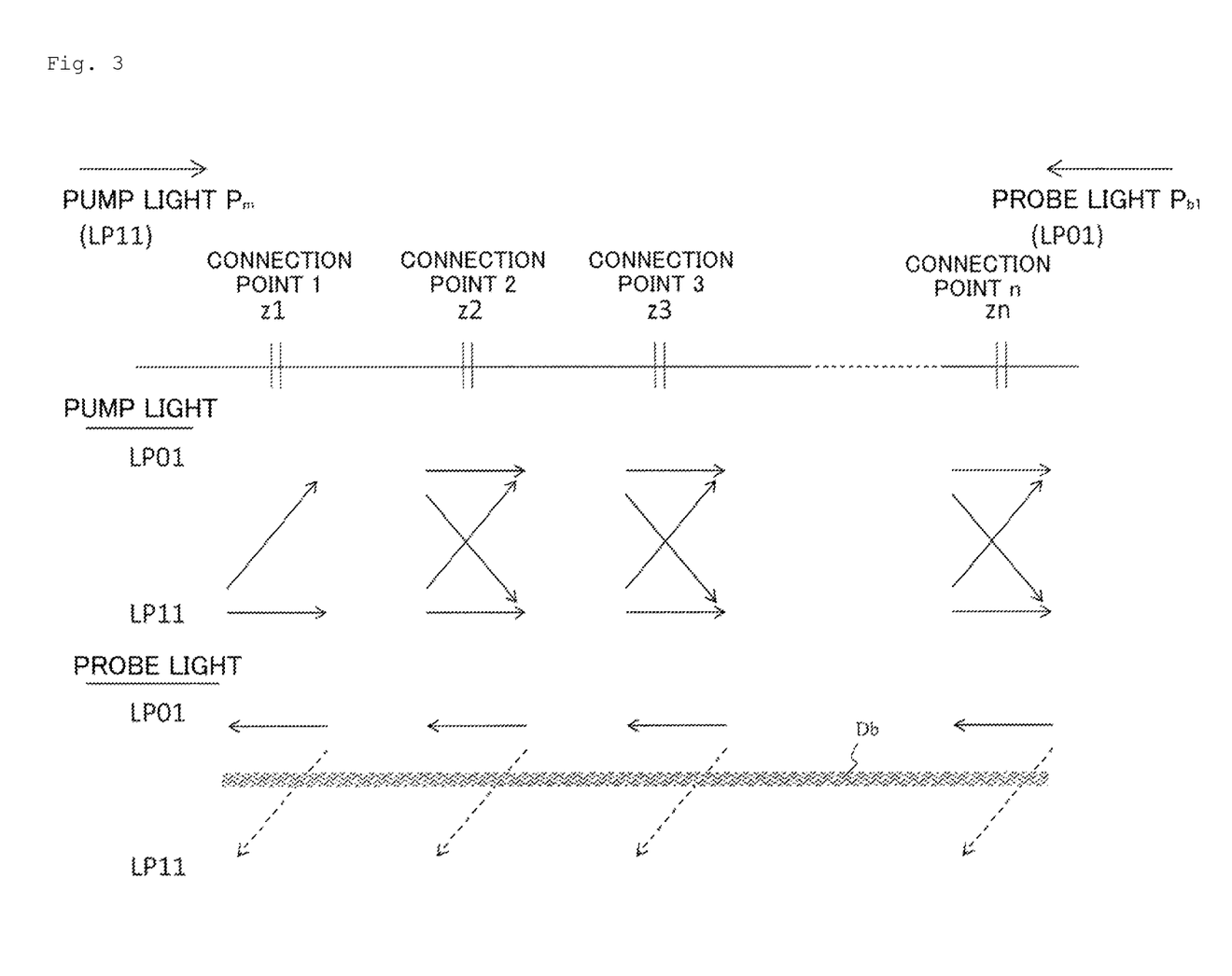
FIG. 3 is a diagram illustrating the measurement principle of the optical fiber measurement system according to the present invention.

For the explanation of the present embodiment, an optical fiber transmission line model in which there are n connection points (losses and XT generation points) as shown in FIG. 3 is considered as an example. In this model, an $LP_{11}$ mode is used for the pump light Pm, an $LP_{01}$ mode is used for the probe light Pb1, and amplification amounts of Brillouin amplification generated in the probe light Pb1 at collision with the pump light Pm are compared in the longitudinal direction, thereby measuring loss and XT amount generated at each connection point. Further, a frequency difference in which Brillouin interaction is strongly generated by a combination of v11-11 is imparted to the probe light Pb1 and the secondary probe light Pb2, and the secondary probe light Pb2 of the $LP_{11}$ mode is made incident from the incident side of the pump light Pm.

As shown in FIG. 3, when the pump light Pm and the probe light Pb1 pass through each connection point, two of loss and XT coupled to other mode components are generated. Here, Brillouin interaction between an $LP_{11}$ mode which is an XT component of the probe light Pb1 generated at each connection point and an $LP_{11}$ mode of the secondary probe light Pb2 is generated in the whole section of the optical fiber to be measured, and Brillouin loss Db is given only to the $LP_{11}$ mode of the probe light Pb1, thereby allowing only the probe light Pb1 of $LP_{01}$ to exist in the fiber.

When the light intensities of the pump light Pm and the probe light Pb1 made incident on the optical fiber are defined as $P_r$ and Pp, respectively, a Brillouin amplification amount $\Delta Ps_{01}$ of the $LP_{01}$ probe light Pb1 generated at the point z of the transmission line can be expressed by z as follows.

[Math. 2]

$$\Delta P_{s01}(z \mid z \leq z_1) = g_{01-11} \overset{\leftarrow n \sim 2}{\eta_{01-01}} \overset{\leftarrow 1}{\eta_{01-01}} P_r P_p, \quad (2)$$

[Math. 3]

$$\Delta P_{s01}(z \mid z_1 \leq z \leq z_2) = \quad (3)$$

$$\left( g_{01-11} \overset{\leftarrow n \sim 2}{\eta_{01-01}} P_r \overset{\rightarrow 1}{\eta_{11-01}} P_p + g_{01-01} \overset{\leftarrow n \sim 2}{\eta_{01-01}} P_r \overset{\rightarrow 1}{\eta_{11-01}} P_p \right) \overset{\leftarrow 1}{\eta_{01-01}},$$

[Math. 4]

$$\Delta P_{s01}(z \mid z_2 \leq z \leq z_3) = \left\{ g_{01-01} \left( \overset{\rightarrow 1}{\eta_{11-11}} \overset{\rightarrow 2}{\eta_{11-01}} + \overset{\rightarrow 1}{\eta_{11-12}} \overset{\rightarrow 2}{\eta_{01-01}} \right) + \right. \quad (4)$$

$$\left. g_{01-11} \left( \overset{\rightarrow 1}{\eta_{11-11}} \overset{\rightarrow 2}{\eta_{11-11}} + \overset{\rightarrow 1}{\eta_{11-01}} \overset{\rightarrow 2}{\eta_{01-11}} \right) \right\} P_p \overset{\leftarrow n \sim 1}{\eta_{01-01}} P_r,$$

[Math. 5]

$$\Delta P_{s01}(z \mid z_{n-1} \leq z \leq z_n) = \left( g_{01-01} \overset{\rightarrow 1 \sim n-1}{\eta_{11-01}} + g_{01-11} \overset{\rightarrow 1 \sim n-1}{\eta_{11-11}} \right) P_p \overset{\leftarrow n \sim 1}{\eta_{01-01}} P_r, \quad (5)$$

[Math. 6]

$$\Delta P_{s01}(z \mid z_n \leq z) = \left\{ g_{01-01} \left( \overset{\rightarrow 1 \sim n-1}{\eta_{11-01}} \overset{\rightarrow n}{\eta_{01-01}} + \overset{\rightarrow 1 \sim n-1}{\eta_{11-11}} \overset{\rightarrow n}{\eta_{11-01}} \right) + \right. \quad (6)$$

-continued $$g_{01-11}\left(\overset{\rightarrow 1\sim n-1\rightarrow n}{\eta_{11-11}}\overset{\rightarrow 1\sim n-1\rightarrow n}{\eta_{11-11}}+\overset{\rightarrow 1\sim n-1\rightarrow n}{\eta_{11-01}}\overset{\rightarrow 1\sim n-1\rightarrow n}{\eta_{01-11}}\right)\right\}P_p\overset{\rightarrow n\sim 1}{\eta_{01-01}}P_r,$$

Here, $g_{01-01}$ and $g_{01-11}$ are gain coefficients between $LP_{01}$ and $LP_{01}$ and $LP_{01}$ and $LP_{11}$, respectively, and $\eta_k^{ab-cd}$ is a coupling efficiency from $LP_{ab}$ to $LP_{cd}$ mode at a kth connection point when viewed from the pump light Pm incident side. Here, when k is 1 to n and n to 1, it is a coupling efficiency when passing through the first to nth and nth to first connection points, respectively, and in an arrow attached above η, a "right arrow" indicates the pump light Pm, and a "left arrow" indicates the coupling efficiency of the probe light Pb1. For simplicity, propagation loss received by the pump light Pm and the probe light Pb1 is ignored.

When the Brillouin amplification amounts of Formulas (2) to (5) are compared in the longitudinal direction, the level difference L of the probe amplification amount (see FIG. 6) observed at each connection point is as follows.

Figure 6:
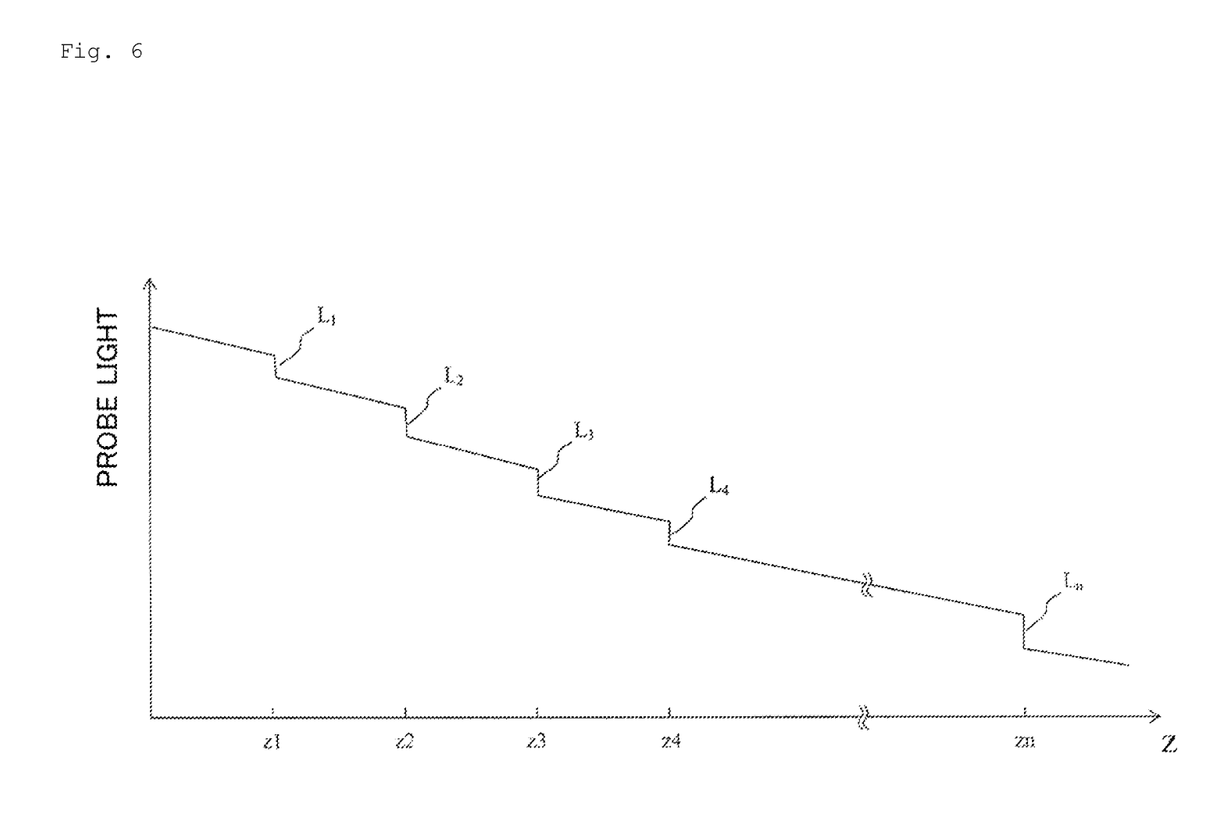
FIG. 6 is a diagram illustrating an amplification amount of the probe light measured by the optical fiber measurement system according to the present invention.

[Math. 7]

$$L_1 = \frac{\Delta P_{s01}(z\,|\,z_1 \leq z \leq z_2)}{\Delta P_{s01}(z\,|\,z \leq z_1)} = \overset{\rightarrow 1}{\eta_{11-11}} + \frac{g_{01-01}}{g_{01-11}}\overset{\rightarrow 1}{\eta_{11-01}}. \quad (7)$$

[Math. 8]

$$L_2 = \frac{\Delta P_{s01}(z\,|\,z_2 \leq z \leq z_3)}{\Delta P_{s01}(z\,|\,z_1 \leq z \leq z_2)}$$

$$= \frac{g_{01-01}\left(\overset{\rightarrow 1}{\eta_{11-11}}\overset{\rightarrow 2}{\eta_{11-01}}+\overset{\rightarrow 1}{\eta_{11-01}}\overset{\rightarrow 2}{\eta_{01-01}}\right)+ g_{01-11}\left(\overset{\rightarrow 1}{\eta_{11-11}}\overset{\rightarrow 2}{\eta_{11-11}}+\overset{\rightarrow 1}{\eta_{11-01}}\overset{\rightarrow 2}{\eta_{01-11}}\right)}{g_{01-01}\overset{\rightarrow 1}{\eta_{11-01}}+g_{01-11}\overset{\rightarrow 1}{\eta_{11-11}}}. \quad (8)$$

[Math. 9]

$$L_3 = \frac{\Delta P_{s01}(z\,|\,z_3 \leq z \leq z_4)}{\Delta P_{s01}(z\,|\,z_2 \leq z \leq z_3)}$$

$$= \frac{g_{01-01}\left(\overset{\rightarrow 1\sim 2}{\eta_{11-11}}\overset{\rightarrow 3}{\eta_{11-01}}+\overset{\rightarrow 1\sim 2}{\eta_{11-01}}\overset{\rightarrow 3}{\eta_{01-01}}\right)+ g_{01-11}\left(\overset{\rightarrow 1\sim 2}{\eta_{11-11}}\overset{\rightarrow 3}{\eta_{11-11}}+\overset{\rightarrow 1\sim 2}{\eta_{11-01}}\overset{\rightarrow 3}{\eta_{01-11}}\right)}{g_{01-01}\overset{\rightarrow 1\sim 2}{\eta_{11-01}}+g_{01-11}\overset{\rightarrow 1\sim 2}{\eta_{11-11}}}. \quad (9)$$

[Math. 10]

$$L_n = \frac{\Delta P_{s01}(z\,|\,z_n \leq z)}{\Delta P_{s01}(z\,|\,z_{n-1} \leq z \leq z_n)}$$

$$= \frac{g_{01-01}\left(\overset{\rightarrow 1\sim n-1\rightarrow n}{\eta_{11-11}}\overset{\rightarrow 1\sim n-1\rightarrow n}{\eta_{11-01}}+\overset{\rightarrow 1\sim n-1\rightarrow n}{\eta_{11-01}}\overset{\rightarrow 1\sim n-1\rightarrow n}{\eta_{01-01}}\right)+ g_{01-11}\left(\overset{\rightarrow 1\sim n-1\rightarrow n}{\eta_{11-11}}\overset{\rightarrow 1\sim n-1\rightarrow n}{\eta_{11-11}}+\overset{\rightarrow 1\sim n-1\rightarrow n}{\eta_{11-01}}\overset{\rightarrow 1\sim n-1\rightarrow n}{\eta_{01-11}}\right)}{g_{01-01}\overset{\rightarrow 1\sim n-1}{\eta_{11-01}}+g_{01-11}\overset{\rightarrow 1\sim n-1}{\eta_{11-11}}}. \quad (10)$$

From Formulas (7) to (10), it can be seen that the observed level difference is a value including the loss component and the XT component received by the pump light Pm. Further, it can be seen that there is a shape in which $L_2$ in [Math. 8] and $L_3$ in [Math. 9] are values including the loss and XT that occur at the connection points before that, and 2 and 3 are substituted for n of $L_n$ shown in [Math. 10].

Then, the information of loss and XT is acquired, using the level difference observed at each connection point and the gain coefficient. Here, since all $L_2$ to $L_n$ are expressed by $L_n$, the loss and the XT measuring procedure occurring at the first connection point using $L_1$, and the loss and the XT measuring procedure occurring at the n-th connection point using $L_n$ will be described below.

(i) Loss and XT at the First Connection Point

As shown in [Math. 7], $L_1$ is expressed by the gain coefficient between the loss of $LP_{11}$ and XT and mode, where $L_1$ and the gain coefficient utilize the characteristic depending on the frequency difference ν between the pump and probe. When the frequency difference is taken into consideration, $L_1$ of [Math. 7] is expressed as follows.

[Math. 11]

$$L_1(\nu) = \overset{\rightarrow 1}{\eta_{11-11}} \frac{g_{01-01}(\nu)}{g_{01-11}(\nu)} \overset{\rightarrow 1}{\eta_{11-01}} = \overset{\rightarrow 1}{\eta_{11-11}} + K(\nu)\overset{\rightarrow 1}{\eta_{11-01}}. \quad (11)$$

Here, K(ν) is a ratio of $g_{01-01}(\nu)$ and $g_{01-11}(\nu)$. When the results acquired at the two frequency differences of $\nu_2$ and $\nu_2$ are utilized, the loss and XT generated at the connection point 1 (z1) can be expressed as follows.

[Math. 12]

$$\overset{\rightarrow 1}{\eta_{11-11}} = \frac{K(\nu_1)L_1(\nu_2) - K(\nu_2)L_1(\nu_1)}{K(\nu_1) - K(\nu_2)}. \quad (12)$$

[Math. 13]

$$\overset{\rightarrow 1}{\eta_{11-01}} = \frac{L_1(\nu_1) - L_1(\nu_2)}{K(\nu_1) - K(\nu_2)}. \quad (13)$$

Here, since K and $L_1$ can be measured respectively, a loss generated at the connection point 1 can be acquired using [Math. 12], and XT can be acquired using [Math. 13].

(ii) Loss and XT at the n-th Connection Point

Similar to the processing of (i), the characteristics in which the $L_n$ and the gain coefficient depend on the frequency difference ν between the pump and the probe are utilized. Considering the frequency difference, $L_n$ in [Math. 10] is expressed as follows:

[Math. 14]

$$L_n(\nu) = \frac{g_{01-01}(\nu)\left(\overset{\rightarrow 1\sim n-1\rightarrow n}{\eta_{11-11}}\overset{\rightarrow 1\sim n-1\rightarrow n}{\eta_{11-01}}+\overset{\rightarrow 1\sim n-1\rightarrow n}{\eta_{11-01}}\overset{\rightarrow 1\sim n-1\rightarrow n}{\eta_{01-01}}\right)+ g_{01-11}(\nu)\left(\overset{\rightarrow 1\sim n-1\rightarrow n}{\eta_{11-11}}\overset{\rightarrow 1\sim n-1\rightarrow n}{\eta_{11-11}}+\overset{\rightarrow 1\sim n-1\rightarrow n}{\eta_{11-01}}\overset{\rightarrow 1\sim n-1\rightarrow n}{\eta_{01-11}}\right)}{g_{01-01}(\nu)\overset{\rightarrow 1\sim n-1}{\eta_{11-01}}+g_{01-11}(\nu)\overset{\rightarrow 1\sim n-1}{\eta_{11-11}}}. \quad (14)$$

Here, it is assumed that the denominator of [Math. 14] is deformed to I(ν).

[Math. 15]

$$L_n(\nu)I(\nu) = g_{01-01}(\nu)\left(\overset{\rightarrow 1\sim n-1\rightarrow n}{\eta_{11-11}}\overset{\rightarrow 1\sim n-1\rightarrow n}{\eta_{11-01}}+\overset{\rightarrow 1\sim n-1\rightarrow n}{\eta_{11-01}}\overset{\rightarrow 1\sim n-1\rightarrow n}{\eta_{01-01}}\right)+ g_{01-11}(\nu)\left(\overset{\rightarrow 1\sim n-1\rightarrow n}{\eta_{11-11}}\overset{\rightarrow 1\sim n-1\rightarrow n}{\eta_{11-11}}+\overset{\rightarrow 1\sim n-1\rightarrow n}{\eta_{11-01}}\overset{\rightarrow 1\sim n-1\rightarrow n}{\eta_{01-11}}\right). \quad (15)$$

When the results acquired in four frequency differences of $\nu_1$, $\nu_2$, $\nu_3$, and $\nu_4$ are utilized

[Math. 16]

$$\begin{bmatrix} L_n(v_1)I(v_1) \\ L_n(v_2)I(v_2) \\ L_n(v_3)I(v_3) \\ L_n(v_4)I(v_4) \end{bmatrix} = \begin{bmatrix} g_{01-01}(v_1)\vec{\eta}_{11-01}^{1\sim n-1} & g_{01-11}(v_1)\vec{\eta}_{11-01}^{1\sim n-1} & g_{01-01}(v_1)\vec{\eta}_{11-11}^{1\sim n-1} & g_{01-11}(v_1)\vec{\eta}_{11-11}^{1\sim n-1} \\ g_{01-01}(v_2)\vec{\eta}_{11-01}^{1\sim n-1} & g_{01-11}(v_2)\vec{\eta}_{11-01}^{1\sim n-1} & g_{01-01}(v_2)\vec{\eta}_{11-11}^{1\sim n-1} & g_{01-11}(v_2)\vec{\eta}_{11-11}^{1\sim n-1} \\ g_{01-01}(v_3)\vec{\eta}_{11-01}^{1\sim n-1} & g_{01-11}(v_3)\vec{\eta}_{11-01}^{1\sim n-1} & g_{01-01}(v_3)\vec{\eta}_{11-11}^{1\sim n-1} & g_{01-11}(v_3)\vec{\eta}_{11-11}^{1\sim n-1} \\ g_{01-01}(v_4)\vec{\eta}_{11-01}^{1\sim n-1} & g_{01-11}(v_4)\vec{\eta}_{11-01}^{1\sim n-1} & g_{01-01}(v_4)\vec{\eta}_{11-11}^{1\sim n-1} & g_{01-11}(v_4)\vec{\eta}_{11-11}^{1\sim n-1} \end{bmatrix} \begin{bmatrix} \vec{\eta}_{01-01}^{n} \\ \vec{\eta}_{01-11}^{n} \\ \vec{\eta}_{11-01}^{n} \\ \vec{\eta}_{11-11}^{n} \end{bmatrix} \quad (16)$$

is expressed as. In [Math. 16], when the inverse matrix of the matrix including the gain coefficient is multiplied, [Math. 16] can be modified as follows.

[Math. 17]

$$\begin{bmatrix} \vec{\eta}_{01-01}^{n} \\ \vec{\eta}_{01-11}^{n} \\ \vec{\eta}_{11-01}^{n} \\ \vec{\eta}_{11-11}^{n} \end{bmatrix} = \begin{bmatrix} g_{01-01}(v_1)\vec{\eta}_{11-01}^{1\sim n-1} & g_{01-11}(v_1)\vec{\eta}_{11-01}^{1\sim n-1} & g_{01-01}(v_1)\vec{\eta}_{11-11}^{1\sim n-1} & g_{01-11}(v_1)\vec{\eta}_{11-11}^{1\sim n-1} \\ g_{01-01}(v_2)\vec{\eta}_{11-01}^{1\sim n-1} & g_{01-11}(v_2)\vec{\eta}_{11-01}^{1\sim n-1} & g_{01-01}(v_2)\vec{\eta}_{11-11}^{1\sim n-1} & g_{01-11}(v_2)\vec{\eta}_{11-11}^{1\sim n-1} \\ g_{01-01}(v_3)\vec{\eta}_{11-01}^{1\sim n-1} & g_{01-11}(v_3)\vec{\eta}_{11-01}^{1\sim n-1} & g_{01-01}(v_3)\vec{\eta}_{11-11}^{1\sim n-1} & g_{01-11}(v_3)\vec{\eta}_{11-11}^{1\sim n-1} \\ g_{01-01}(v_4)\vec{\eta}_{11-01}^{1\sim n-1} & g_{01-11}(v_4)\vec{\eta}_{11-01}^{1\sim n-1} & g_{01-01}(v_4)\vec{\eta}_{11-11}^{1\sim n-1} & g_{01-11}(v_4)\vec{\eta}_{11-11}^{1\sim n-1} \end{bmatrix}^{-1} \begin{bmatrix} L_n(v_1)I(v_1) \\ L_n(v_2)I(v_2) \\ L_n(v_3)I(v_3) \\ L_n(v_4)I(v_4) \end{bmatrix} \quad (17)$$

Here, $L_1$ can be measured, and $g_{01-01}$ and $g_{01-11}$ can be acquired in advance. Further, since can be calculated from the measured value of the loss and XT at all the connection points from the connection point 1 to the connection point n−1, $I(v_1)$ to $I(v_4)$ can also be acquired. Therefore, the loss and XT generated at the connection point n can be acquired, using [Math. 17].

In other words, the calculation unit 31
acquires a distribution of a Brillouin amplification amount of the probe light Pb1 in a longitudinal direction of the optical fiber to be measured from the light intensity, and
calculates the loss and crosstalk, by utilizing a level difference L of the Brillouin amplification amount appearing in the distribution, and a Brillouin gain coefficient determined by an optical frequency difference between the pump light Pm and the probe light Pb1 and a propagation mode.

Figure 4:
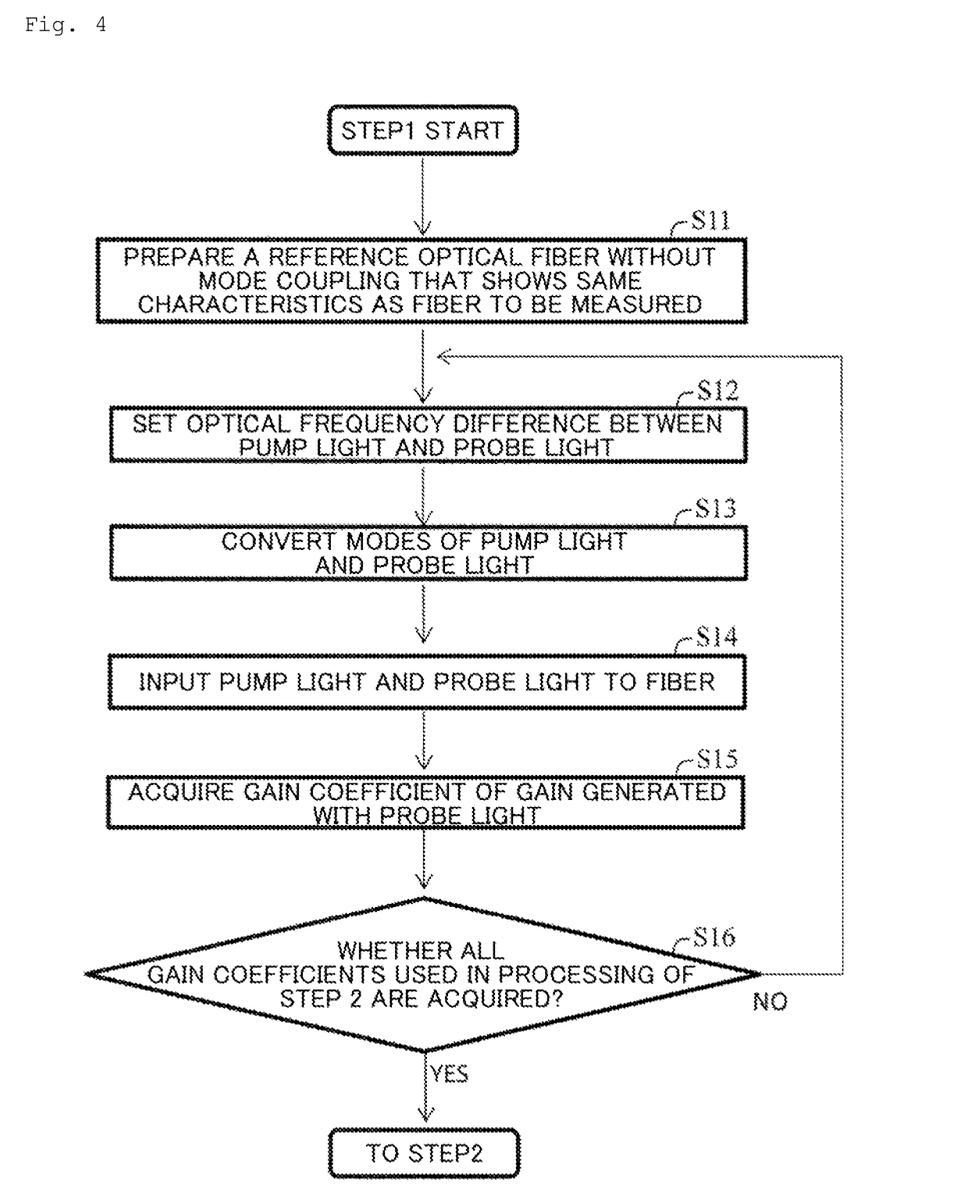
FIG. 4 is a diagram illustrating an optical fiber measurement method according to the present invention.
Figure 5:
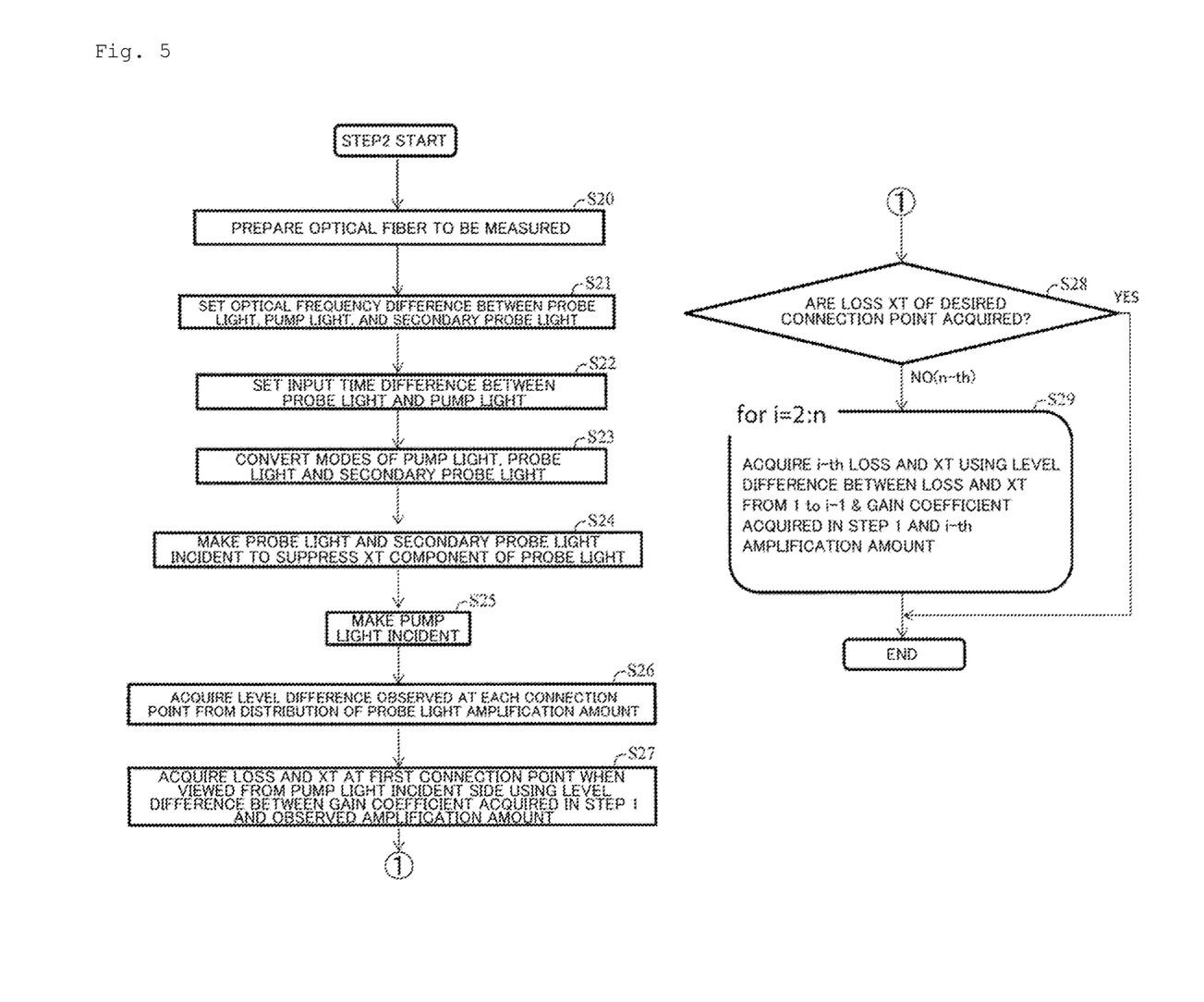
FIG. 5 is a diagram illustrating an optical fiber measurement method according to the present invention.

FIGS. 4 and 5 are diagrams showing the optical fiber measurement method performed by the optical fiber measurement system 301. The present optical fiber measurement method is an example in which the Brillouin gain coefficient is acquired using the reference optical fiber first.

FIG. 4 is a flow chart that explains a step 1 for acquiring the Brillouin gain coefficient. In the step 1, first, a reference optical fiber having no mode coupling showing the same characteristics as the optical fiber to be measured is prepared and connected to the optical fiber measurement system 301 (step S11). Next, the control unit 32 sets an optical frequency difference between the probe light Pb1 and the pump light Pm with respect to the optical frequency control means 23 (step S12). Further, the control unit 32 sets a propagation mode of the pump light Pm and the probe light Pb1 to be propagated to the reference optical fiber, with respect to the mode multiplexing/demultiplexing means 22 and the mode selection multiplexing/demultiplexing means 27 (step S13). The mode multiplexing/demultiplexing means 22 and the mode selection multiplexing/demultiplexing means 27 make the pump light Pm and the probe light Pb1 incident on a reference optical fiber (step S14). The calculation unit 31 acquires a gain coefficient of a Brillouin gain generated in the probe light Pb1 (step S16). The control unit 32 determines whether all the Brillouin gain coefficients used in the optical fiber to be measured (all combinations of the pump light Pm and the probe light Pb1 for all propagation modes propagating in the optical fiber to be measured) are acquired (step S16). If there is a non-acquired combination ("No" in step S16), the work from step S12 is repeated. If all combinations are acquired ("Yes" in step S16), the process proceeds to step 2.

FIG. 5 is a flowchart which explains step 2 for measuring loss and XT at the connection point of the optical fiber to be measured. First, the optical fiber to be measured is connected to an optical fiber measurement system 301 (step S20). Next, the control unit 32 sets an optical frequency difference between the probe light Pb1 and the pump light Pm and the secondary probe light Pb2 with respect to the optical frequency control means 23 and 24 (step S21). The control unit 32 sets the incident time of the pump light Pm with respect to the optical pulse forming means 26 (step S22). Further, the control unit 32 sets the propagation modes of the pump light Pm, the probe light Pb1 and the secondary probe light Pb2 to be propagated to the reference optical fiber, with respect to the mode multiplexing/demultiplexing means 22 and the mode selection multiplexing/demultiplexing means 27 (step S23). Then, the light incident circuit 11 makes the probe light Pb1 and the secondary probe light Pb2 incident on the optical fiber to be measured to suppress the XT component of the probe light Pb1 (step S24). The light incident circuit 11 makes the pump light Pm incident on the optical fiber to be measured at a set incident time (step S25). The calculation unit 31 acquires a level difference L observed at each connection point from the distribution of the probe light amplification amount of FIG. 6 (step S26). The calculation unit 31 calculates the loss and XT at the first connection point when viewed from the incident side of the pump light Pm (the other end of the optical fiber 50), by the Formulas (11) to (13), using the Brillouin gain coefficient acquired in the step 1 and the level difference L of the probe light amplification amount observed in FIG. 6 (step S27). The control unit 32 determines whether the loss and the XT of a desired connection point are acquired (step S28). If the loss and XT of the desired connection point are acquired ("Yes", in step S28), the measurement ends. On the other hand, if the loss and XT of the desired connection point cannot be acquired, the calculation unit 31 calculates the loss and XT of the connection point zi, using the loss and XT from the connection points z1 to zi−1, the Brillouin gain coefficient, and the level difference $L_1$ of the i-th amplification amount, by utilizing the Formulas (14) to (17) (step S29).

Embodiment 2

The control calculation device 13 can also be implemented by a computer and a program, and the program can be stored in a storage medium or provided through a network.

Figure 7:
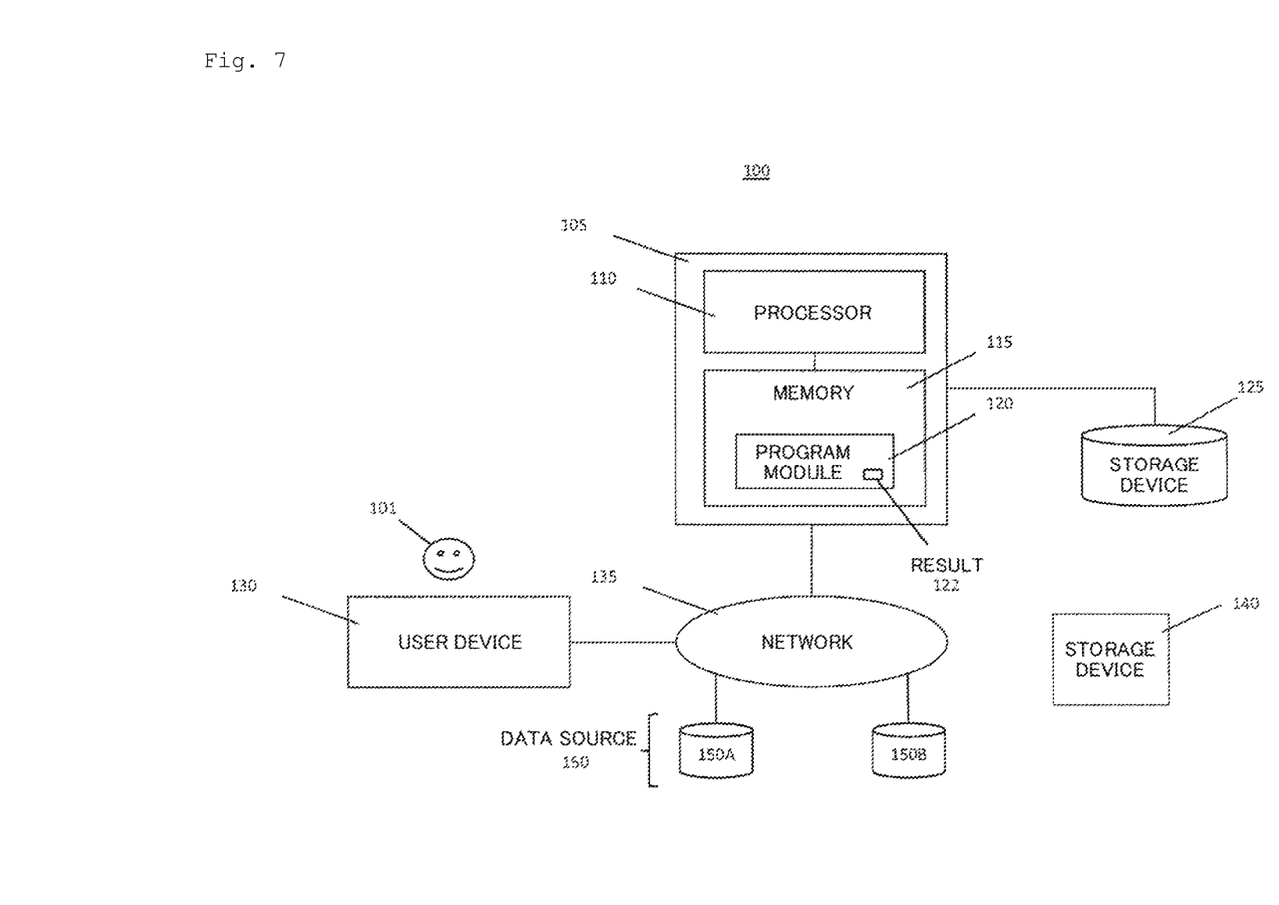
FIG. 7 is a diagram illustrating an optical fiber measurement system according to the present invention.

FIG. 7 illustrates a block diagram of a system 100. The system 100 includes a computer 105 connected to a network 135.

The network 135 is a data communication network. The network 135 may be a private network or a public network, and may include some or all of (a) a personal area network covering, for example, a room, (b) a local area network covering, for example, a building, (c) a campus area network covering, for example, a campus, (d) a metropolitan area network covering, for example, a city, (e) a wide area network covering, for example, an area connected across city, regional or national boundaries, or (f) Internet. The communication is carried out by electronic and optical signals over the network 135.

The computer 105 includes a processor 110 and a memory 115 connected to the processor 110. Although the computer 105 is described herein as a standalone device, the computer arrangement is not limited in this manner, and the computer may be connected to any other device (which is not shown) in the distributed processing system.

The processor 110 is an electronic device including a logic circuit which responds to and executes instructions.

The memory 115 is a storage medium that is readable by a tangible computer having a computer program encoded thereon. In this regard, the memory 115 stores data and instructions that can be read and executed by the processor 110 to control the operation of the processor 110, that is, program code. The memory 115 can be realized by a random access memory (RAM), a hard drive, a read-only memory (ROM) or a combination thereof. One of the elements of the memory 115 is a program module 120.

The program module 120 includes an instruction for controlling the processor 110 to perform the process described herein. Herein, the kinds of operation are described as being executed by the computer 105 or a method or process or sub-processes thereof, but these kinds of operation are actually executed by the processor 110.

The term "module" is used herein to refer to a functional operation that can be embodied as either a stand-alone component or an integrated configuration made up of multiple subordinate components. Therefore, the program module 120 can be realized as a single module or as a plurality of modules operating in cooperation with each other. Although the program module 120 is described herein as being installed in the memory 115 and thus realized as software, the module can be realized as hardware (for example as electronic circuitry), firmware, software, or any combination thereof.

Although program module 120 has been shown as already loaded into the memory 115, it may be configured to be located on the storage device 140 so as to be later loaded into the memory 115. The storage device 140 is a storage medium that is readable by a tangible computer for storing the program module 120. As an example of the storage device 140, a compact disk, a magnetic tape, a read-only memory, an optical storage medium, a memory unit made up of hard drives or a plurality of parallel hard drives, and a universal serial bus (USB) flash drive are adopted. Alternatively, the storage device 140 may be a random access memory or any other kind of electronic storage device located in a remote storage system (which is not shown) and connected to the computer 105 over the network 135.

The system 100 further includes a data source 150A and a data source 150B collectively referred to herein as data sources 150 and communicatively connected to the network 135. In practice, the data source 150 may include any number of data sources, i.e., one or more data sources. The data source 150 can include non-systemized data and can include social media.

The system 100 further includes a user device 130 which is operated by the user 101 and connected to the computer 105 over the network 135. The user device 130 can be an input device such as a keyboard or a voice recognition subsystem for allowing the user 101 to communicate information and command selection to the processor 110. The user device 130 further includes an output device such as a display device or printer or a speech synthesizer. A cursor control unit such as a mouse device, a trackball, and a touch-sensitive screen allows the user 101 to manipulate the cursor on the display device to communicate further information and command selection to the processor 110.

The processor 110 outputs the results 122 of the execution of the program module 120 to the user device 130. Alternatively, the processor 110 can bring the output to a storage device 125 such as a database and a memory or to a remote device (which is not shown) over the network 135.

For example, a program for performing the flowcharts of FIGS. 4 and 5 may be set as the program module 120. The system 100 can be operated as the control calculation device 13.

It should be construed that the terms "comprises," "comprising," "includes," or "including" specify the presence of stated features, integers, steps, or elements, but do not preclude the presence of one or more other features, integers, steps, or elements or groups thereof. The indefinite articles "a" and "an" do not preclude the presence of an embodiment including a plurality of the referenced items.

Other Embodiments

Note that the present invention is not limited by the above-described embodiments but can be carried out in various forms without departing from the gist and scope of the invention. In short, the present invention is not limited by the above-described embodiments as it is and can be embodied by the modification of components without departing from the gist and scope of the invention in the application.

Also, various inventions can be formed by appropriate combinations of the plurality of components disclosed in the above embodiments. For example, some components may be deleted from all components shown in the embodiments. Components across different embodiments may be combined as appropriate.

Effects of the Invention

According to the present invention, it is possible to suppress the loss due to Brillouin gain analysis method and the XT component of the probe light Pb1 in the fiber, which is a problem in the XT measurement, in the optical fiber to be measured, and the loss and XT generated at each point can be measured independently of each other.

REFERENCE SIGNS LIST

11 Light incident circuit
12 Light receiver

13 Control calculation device
21 Laser beam generating means
22 Mode multiplexing/demultiplexing means
23, 24 Optical frequency control means
25 Branching element
26 Optical pulse forming means
27 Mode selection multiplexing/demultiplexing means
31 Calculation unit
31a Digitizing processing means
31b Numerical calculation means
32 Control unit
50 Optical fiber
100 System
101 User
105 Computer
110 Processor
115 Memory
120 Program module
122 Result
125 Storage device
130 User device
135 Network
140 Storage device
150 Data source
301 Optical fiber measurement system

The invention claimed is:

1. An optical fiber measurement system comprising:
a light incident circuit which makes a probe light incident on one end of an optical fiber and makes a secondary probe light and a pump light as an optical pulse incident on the other end of the optical fiber;
a light receiver which measures a light intensity of arbitrary one propagation mode in the probe light propagating through the optical fiber; and
a control calculation device which sets a propagation mode of the probe light, the secondary probe light, and the pump light, an optical frequency difference of the secondary probe light with respect to the pump light, and an optical frequency difference of the pump light with respect to the pump light, and calculates loss and crosstalk at each point in a longitudinal direction of the optical fiber, from the light intensity measured by the light receiver,
wherein the control calculation device when the optical fiber is connected as the optical fiber, with respect to the light incident circuit,
makes the probe light incident on one end of the optical fiber in an arbitrary propagation mode,
makes the secondary probe light incident on the other end of the optical fiber in a propagation mode which becomes a crosstalk component of the probe light, where the secondary probe light having an optical frequency difference with the probe light that is lower than the frequency of the probe light,
makes the pump light incident in an arbitrary propagation mode, where the pump light having an optical frequency difference with the probe light that is higher than frequency of the probe light,
acquires a distribution of a Brillouin amplification amount of the probe light in the longitudinal direction of the optical fiber to be measured from the light intensity, and
calculates the loss and crosstalk, using a level difference of the Brillouin amplification amount appearing in the distribution and a Brillouin gain coefficient determined by an optical frequency difference between the pump light and the probe light and a propagation mode.

2. The optical fiber measurement system according to claim 1,
wherein, when a reference optical fiber having the same characteristics as the optical fiber to be measured and having no mode coupling is connected as the optical fiber, with respect to the light incident circuit, the control calculation device
makes the probe light incident on one end of the optical fiber and the pump light incident on the other end of the optical fiber, while changing an optical frequency difference between the probe light and the pump light in a combination of all propagation modes propagating through the optical fiber to be measured, and
acquires the Brillouin gain coefficient in a combination of each optical frequency difference and each propagation mode from the light intensity.

3. The optical fiber measurement system according to claim 1, wherein the control calculation device sets
the optical frequency difference between the secondary probe light and the probe light,
as the optical frequency difference that gives Brillouin loss only to the crosstalk component of the probe light.

4. An optical fiber measurement method, using an optical fiber measurement system which includes
a light incident circuit which makes a probe light incident on one end of an optical fiber and makes a secondary probe light and a pump light as an optical pulse incident on the other end of the optical fiber,
a light receiver which measures a light intensity of arbitrary one propagation mode in the probe light propagating through the optical fiber, and
a control calculation device which sets a propagation mode of the probe light, the secondary probe light, and the pump light, an optical frequency difference of the secondary probe light with respect to the probe light, and an optical frequency difference of the pump light with respect to the probe light, and calculates loss and crosstalk at each point in a longitudinal direction of the optical fiber, from the light intensity measured by the light receiver, wherein which when the optical fiber is connected as the optical fiber,
making the probe light incident on one end of the optical fiber in an arbitrary propagation mode;
making the secondary probe light incident on the other end of the optical fiber in a propagation mode which becomes a crosstalk component of the probe light, where the secondary probe light having the optical frequency difference with the probe light that is lower than the frequency of the probe light;
making the pump light incident in an arbitrary propagation mode, where the pump light having the optical frequency difference with the probe light that is higher than frequency of the probe light;
acquiring a distribution of a Brillouin amplification amount of the probe light in the longitudinal direction of the optical fiber to be measured from the light intensity; and
calculating the loss and crosstalk, using a level difference of the Brillouin amplification amount appearing in the distribution and a Brillouin gain coefficient determined by an optical frequency difference between the pump light and the probe light and a propagation mode.

5. A control calculation device of an optical fiber measurement system comprising:
a light incident circuit which makes a probe light incident on one end of an optical fiber and makes a secondary probe light and a pump light as an optical pulse incident on the other end of the optical fiber; and a light receiver which measures a light intensity of arbitrary one propagation mode in the probe light propagating through the optical fiber, wherein the control calculation device includes a control unit which sets a propagation mode of the probe light, the secondary probe light, and the pump light, an optical frequency difference of the secondary probe light with respect to the probe light, and an optical frequency difference of the pump light with respect to the probe light, and a calculation unit which calculates loss and crosstalk at each point in a longitudinal direction of the optical fiber, from the light intensity measured by the light receiver, wherein when the optical fiber is connected to the optical fiber measurement system, with respect to the light incident circuit, the control unit makes the probe light incident on one end of the optical fiber in an arbitrary propagation mode, makes the secondary probe light incident on the other end of the optical fiber in a propagation mode which becomes a crosstalk component of the probe light, where the secondary probe light having the optical frequency difference with the probe light that is lower than the frequency of the probe light, and makes the pump light incident in an arbitrary propagation mode, where the pump light having the optical frequency difference with the probe light that is higher than frequency of the probe light, wherein the calculation unit acquires a distribution of a Brillouin amplification amount of the probe light in the longitudinal direction of the optical fiber to be measured from the light intensity, and calculates the loss and crosstalk, using a level difference of the Brillouin amplification amount appearing in the distribution, an optical frequency difference between the pump light and the probe light, and a Brillouin gain coefficient determined by a propagation mode.

6. The control calculation device according to claim 5, wherein when a reference optical fiber having the same characteristics as the optical fiber to be measured and having no mode coupling is connected to the optical fiber measurement system as the optical fiber, with respect to the light incident circuit, the control unit makes the probe light incident on one end of the optical fiber and the pump light incident on the other end of the optical fiber, while changing an optical frequency difference between the probe light and the pump light in a combination of all propagation modes propagating through the optical fiber to be measured, and the calculation unit acquires the Brillouin gain coefficient in a combination of each optical frequency difference and each propagation mode from the light intensity.

7. The control calculation device according to claim 5, wherein the control unit sets the optical frequency difference between the secondary probe light and the probe light as an optical frequency difference that gives Brillouin loss only to a crosstalk component of the probe light.

* * * * *